United States Patent
Fain et al.

(10) Patent No.: US 10,713,476 B2
(45) Date of Patent: Jul. 14, 2020

(54) HIGH THROUGHPUT PASSENGER IDENTIFICATION IN PORTAL MONITORING

(71) Applicant: Royal Caribbean Cruises Ltd., Miami, FL (US)

(72) Inventors: Richard Fain, Coral Gables, FL (US); Jay Schneider, Miami Beach, FL (US); Joey Hasty, Miami, FL (US); David Smith, Orlando, FL (US); Joshua T. Nakaya, Glendale, CA (US); Laura Barnes, Miami, FL (US)

(73) Assignee: Royal Caribbean Cruises Ltd., Miami, FL (US)

(*) Notice: Subject to any disclaimer, the term of this patent is extended or adjusted under 35 U.S.C. 154(b) by 0 days.

(21) Appl. No.: 15/970,852

(22) Filed: May 3, 2018

(65) Prior Publication Data

US 2019/0377937 A1   Dec. 12, 2019

(51) Int. Cl.
*G06K 9/00* (2006.01)
*G07C 9/37* (2020.01)
*G07C 9/38* (2020.01)
*G07C 11/00* (2006.01)

(52) U.S. Cl.
CPC ..... *G06K 9/00295* (2013.01); *G06K 9/00255* (2013.01); *G06K 9/00718* (2013.01); *G06K 9/00765* (2013.01); *G06K 9/00778* (2013.01); *G07C 9/37* (2020.01); *G07C 9/38* (2020.01); *G07C 2011/04* (2013.01)

(58) Field of Classification Search
None
See application file for complete search history.

(56) References Cited

U.S. PATENT DOCUMENTS

| 7,634,662 | B2 | 12/2009 | Monroe |
| 2013/0195316 | A1 | 8/2013 | Bataller et al. |
| 2016/0350587 | A1 | 12/2016 | Bataller et al. |
| 2018/0205848 | A1* | 7/2018 | Kong ............... H04N 1/2187 |
| 2019/0050631 | A1* | 2/2019 | Hayase ............... G06T 7/38 |

* cited by examiner

*Primary Examiner* — Leon Viet Q Nguyen
(74) *Attorney, Agent, or Firm* — Steven M. Greenberg, Esq.; Shutts & Bowen LLP

(57) ABSTRACT

The present invention provides for high throughput passenger identification in portal security. A method for high throughput passenger identification includes receiving in memory of a host computing system from an image acquisition device a contemporaneously acquired image of a group of individuals approaching a portal passageway and identifying a set of faces of the group. The method yet further includes querying a database of faces with each identified face in the set and for each face assigning a confidence value of having matched the face to a record of a known person in the database. Finally, the method includes visually decorating each face in the contemporaneously acquired image with an initial visual characteristic on condition that a correspondingly assigned confidence value falls short of a threshold, but otherwise with a different visual characteristic, and displaying the contemporaneously acquired image in a display of the host computing system.

19 Claims, 2 Drawing Sheets

HIGH THROUGHPUT PASSENGER IDENTIFICATION IN PORTAL MONITORING

BACKGROUND OF THE INVENTION

Field of the Invention

The present invention relates to the field of access control and portal security and more particularly to the automated machine identification of a passenger.

Description of the Related Art

Portal security refers to the determination of whether or not an individual is permitted to pass through an entranceway into a secure area. Commonly, portal security relates to the context of determining whether or not an individual is permitted to enter a transportation terminal or a vehicle, or a secure area of a building or even an area of assembly such as a public concert hall or sporting venue. Typically, portal security is a manual process involving the manual inspection by a security official of an individual seeking passage through a portal area. The individual provides some sort of documentation as to the identity of the individual and the security official attempts to validate the authenticity of the documentation.

Biometrics plays a role in portal security in many circumstances. In an environment in which the possible number of individuals authorized to access a secure area is small, a database of biometric data for each of the individuals may be maintained at the portal so that the biometric scanning of one of the individuals may be compared to the known records of the limited number of individuals authorized to pass through portal security. But, for larger sets of individuals prospectively seeking access to a secure area, it may not be feasible to know a priori biometric information for each possible individual. In the latter circumstance, either the biometric information must be stored in connection with a credential provided by the individual to the security official when seeking passage through a secure portal, or biometric information may be used only to document the fact that the individual has sought passage into the secure area.

Recently, biometrics has begun to play a larger role in portal security—particularly in the context of airport security. Publically, different governments across the globe have implemented biometric portal security measures in which individual travelers pre-register biometric information such as fingerprint or iris-scan information. Thereafter, when seeking passage through a portal into a secure area, the individual may submit to a biometric scan at a kiosk in conjunction with the presentation of paper credentials. Yet, biometrics while speedier than traditional manual inspection of an individual at a secure portal, still require queuing to access a limited set of kiosks adapted for biometric scanning. In large throughput environments like the modern cruise ship, the individual use of a kiosk can remain burdensome and inefficient.

BRIEF SUMMARY OF THE INVENTION

Embodiments of the present invention address deficiencies of the art in respect to portal security and provide a novel and non-obvious method, system and computer program product for high throughput passenger identification in portal security. In an embodiment of the invention, a data processing system is adapted for high throughput passenger identification in portal security. The system includes a host computing system of at least one processor and memory, an image acquisition device communicatively linked to the host computing system and disposed at a portal passageway leading into a secure area, a display coupled to the host computing system and positioned at the portal passageway, a database of faces coupled to the host computing system, and a high throughput passenger identification module.

The module includes computer program instructions executing in the host computing system. The program instructions are enabled to receive from the image acquisition device a contemporaneously acquired image of a group of individuals approaching the portal passageway, to identify a set of faces of the group of individuals in the contemporaneously acquired image and to query the database with each identified face in the set and for each face assign a confidence value of having matched the face to a record of a known person in the database. The program instructions are additionally enabled to visually decorate each face in the contemporaneously acquired image with an initial visual characteristic, such as a red outline, on condition that a correspondingly assigned confidence value falls short of a threshold, but with a different visual characteristic, such as a green outline, on condition that the correspondingly assigned confidence value does not fall short of the threshold. Finally, the program instructions are enabled to display the contemporaneously acquired image in the display.

In one aspect of the embodiment, the program instructions are further enabled to receive from the image acquisition device a subsequently acquired image of the group of individuals approaching the portal passageway, to identify the set of faces of the group of individuals from the contemporaneously acquired image within the subsequently acquired image and to filter the set to include only those of the faces in the set having a correspondingly but previously assigned confidence value from the contemporaneously acquired image that falls short of the threshold. The program instructions also are further enabled to visually decorate each face filtered from the set in the subsequently acquired image with the different visual characteristic and then to query the database with each face remaining in the filtered set. For each face remaining in the filtered set, a new confidence value of having matched the face to a record of a known person in the database is assigned and each face of the subsequently acquired image in the filtered set visually decorated with the initial visual characteristic on condition that the correspondingly assigned new confidence value falls short of the threshold, but with the different visual characteristic on condition that the correspondingly assigned new confidence value does not fall sort of the threshold. Finally, the subsequently acquired image is displayed in the display in place of the contemporaneously acquired image.

In yet another aspect of the embodiment, the program instructions are further enabled to receive from the image acquisition device a further subsequently acquired image of the group of individuals approaching the portal passageway and to identify a new set of faces of the group of individuals from a most recently, previously acquired image within the further subsequently acquired image. Then, the new set is filtered to include only those of the faces in the new set that have a correspondingly but previously assigned confidence value from the a previously acquired image that falls short of the threshold. As such, each face filtered from the new set is visually decorated with the different visual characteristic and the database queried with each face in the filtered new set. For each face in the filtered new set, a further confidence value of having matched the face to a record of a known person in the database is assigned and each face of the further subsequently acquired image in the filtered new set visually decorated with a new visual characteristic on condition that the correspondingly assigned further confidence value falls short of the threshold, but with the different visual characteristic on condition that the correspondingly further assigned confidence value does not fall short of the threshold. Finally, the further subsequently acquired image is displayed in the display in place of the contemporaneously acquired image.

In another embodiment of the invention, a method for high throughput passenger identification in portal security is provided. The method includes receiving in memory of a host computing system from an image acquisition device a contemporaneously acquired image of a group of individuals approaching the portal passageway. The method also includes identifying a set of faces of the group of individuals in the contemporaneously acquired image. The method yet further includes querying a database of faces with each identified face in the set and for each face assigning a confidence value of having matched the face to a record of a known person in the database. Finally, the method includes visually decorating each face in the contemporaneously acquired image with an initial visual characteristic on condition that a correspondingly assigned confidence value falls short of a threshold, but with a different visual characteristic on condition that the correspondingly assigned confidence value does not fall short of the threshold, and displaying the contemporaneously acquired image in a display of the host computing system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for high throughput passenger identification in portal security. In accordance with an embodiment of the invention, an imaging device disposed at a portal passageway repeatedly captures a sequence of imagery of groups of individuals as the groups approach the portal passageway. Each image in the sequence is then presented in order in a display at the portal passageway so that each individual in an approaching group may observe imagery of the group as the group approaches the portal passageway. For each image in the sequence, different faces are identified in the captured image and each of the different faces are decorated in the displayed image and presented in the display so that the individuals in the approaching group are made aware of a process of facial recognition en masse. In this regard, each of the different faces in each captured image in the sequence is separately compared to a database of known faces authorized to pass through the portal passageway.

A matching of each of the faces is performed against the database with each match having been assigned a particular confidence level indicating a degree of confidence in which a corresponding face in the captured image is matched to a specific face in the database. With respect to each captured image in the sequence, for ones of the faces having a confidence level below a threshold value, the decoration of the face presented in the display has one visual form, for example a red square surrounding the face. But for ones of the faces having a confidence level above the threshold value, the decoration of the face is presented in the display in a different visual form, for example a green square surrounding the face. In this way, multiple different individuals may be processed at once while passing through the portal passageway and as the faces in each captured image in the sequence are matched with a confidence beyond the threshold value, the decoration for each of the faces as presented in the display may change from the initial visual form to the different visual form. As well, each of the individuals in the approaching group are presented with feedback as to whether or not it is permissible to proceed through the portal passageway.

Figure 1:
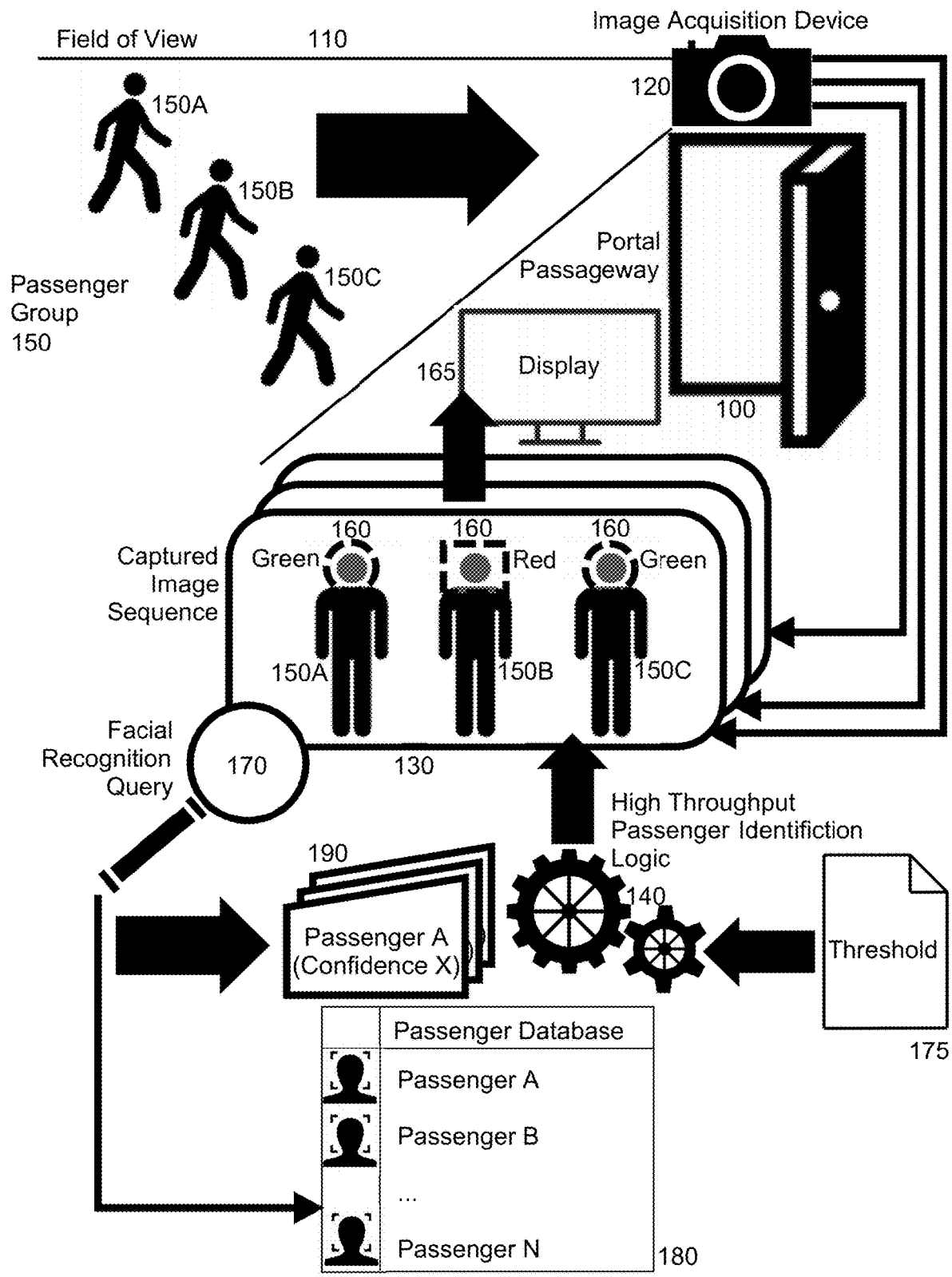
FIG. 1 is a pictorial illustration of a process for high throughput passenger identification in portal security.

In further illustration, FIG. 1 pictorially shows a process for high throughput passenger identification in portal security. As shown in FIG. 1, a group 150 of individuals 150A, 150B, 150C approach a portal passageway 100 within the field of view 110 of an image acquisition device 120 of one or more imaging sensors positioned proximately to the portal passageway 100. Image acquisition device 120 acquires a sequence of different images 130, each of the images 130 in the sequence including imagery of each of the individuals 150A, 150B, 150C. A face for each of the individuals 150A, 150B, 150C is identified in the image 130 and each provided as a facial recognition query 170 to a database of faces 180 correlating different faces to different identifying information for different individuals.

In response to the facial recognition query 170, different matches 190 are returned including different confidence values. Each confidence value indicates a degree of confidence for which a corresponding face matches an entry in the database of faces 180. High throughput passenger identification logic 140 compares the confidence value for each of the faces in the matches 190 to a pre-stored threshold 175. For each face in the matches 190 having a confidence value that falls short of the threshold 175, the high throughput passenger identification logic 140 decorates a corresponding face in the image 130 utilizing one type of visual characteristic 160 such as a red square outlining the corresponding face. But, for each face in the matches 190 having a confidence value that does not fall short of the threshold 174, the high throughput passenger identification logic 140 decorates a corresponding face in the image 130 utilizing a different type of visual characteristic 160, such as a green square outlining the corresponding. Thereafter, the high throughput passenger identification logic 140 presents the image 130 in a display 165 positioning proximately to the portal passageway 100.

Figure 2:
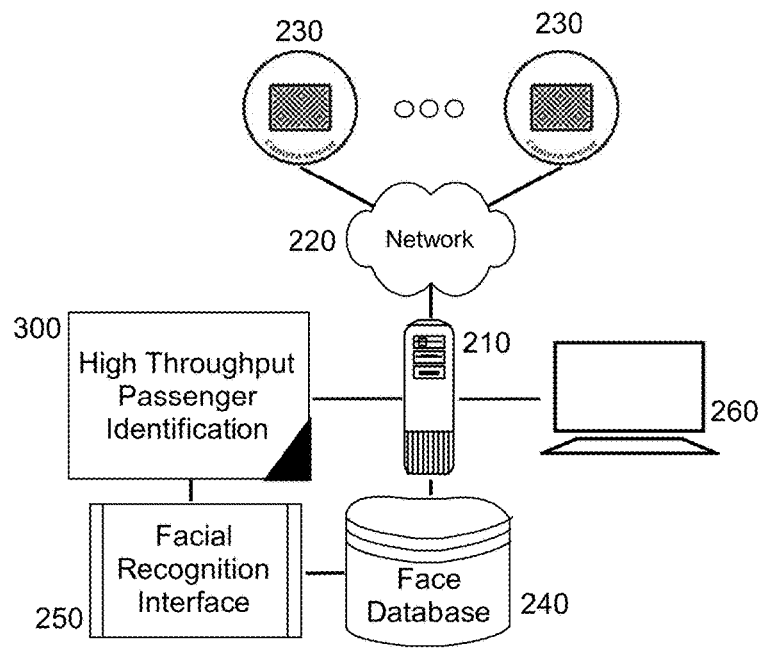
FIG. 2 is a schematic diagram of a data processing system adapted for high throughput passenger identification in portal security; and, FIG. 3 is a flow chart illustrating a process for high throughput passenger identification in portal security.

The process described in connection with FIG. 1 may be implemented in a computer data processing system and, by way of example, in connection with a portal passageway for passengers entering a vehicle such as a ship, bus, train or airplane. In further illustration, FIG. 2 schematically shows a data processing system adapted for high throughput passenger identification in portal security. The system includes a host computing system 210 with memory and at least one processor communicatively coupled over computer communications network 220 to one or more image sensors 230 of an image acquisition device, positioned in sequence towards a portal passageway and adapted to acquire different frames of imagery and to transmit the acquired frames of imagery to the host computing system 210. The system also includes a high throughput passenger identification module 300.

The high throughput passenger identification module 300 includes program instructions which when executing in the memory of the host computing system 210 is enabled receive an acquired image from one or the image sensors 230 and to identify different faces of respectively different individuals in the acquired image utilizing facial recognition interface 250. The program instructions are additionally enabled to compare the identified faces to images of faces in face database 240 so as to produce a set of matches for each of the faces, each match including a corresponding confidence value. The program instructions yet further are enabled to determine which of the faces in the acquired image have been matched to corresponding images of faces in the face database 240 with a degree of confidence according to the confidence value that does not fall short of a pre-stored threshold, and which of the faces in the acquired image have been matched to corresponding images of faces in the face database 240 with a degree of confidence that falls short of the pre-stored threshold.

For those of the faces in the image which are determined by the high throughput passenger identification module 300 to have a confidence value that falls short of the pre-stored threshold, the program instructions decorate the corresponding face in the image in accordance with one visual characteristic such as a red outline about the face in the image. In contrast, for those of the faces in the image which are determined by the high throughput passenger identification module 300 to have a confidence value that does not fall short of the pre-stored threshold, the program instructions decorate the corresponding face in the image in accordance with a different visual characteristic such as a green outline about the face in the image. Finally, the program instructions display the image with the decorated faces in a display 260 positioned proximately to the portal passageway.

Figure 3:
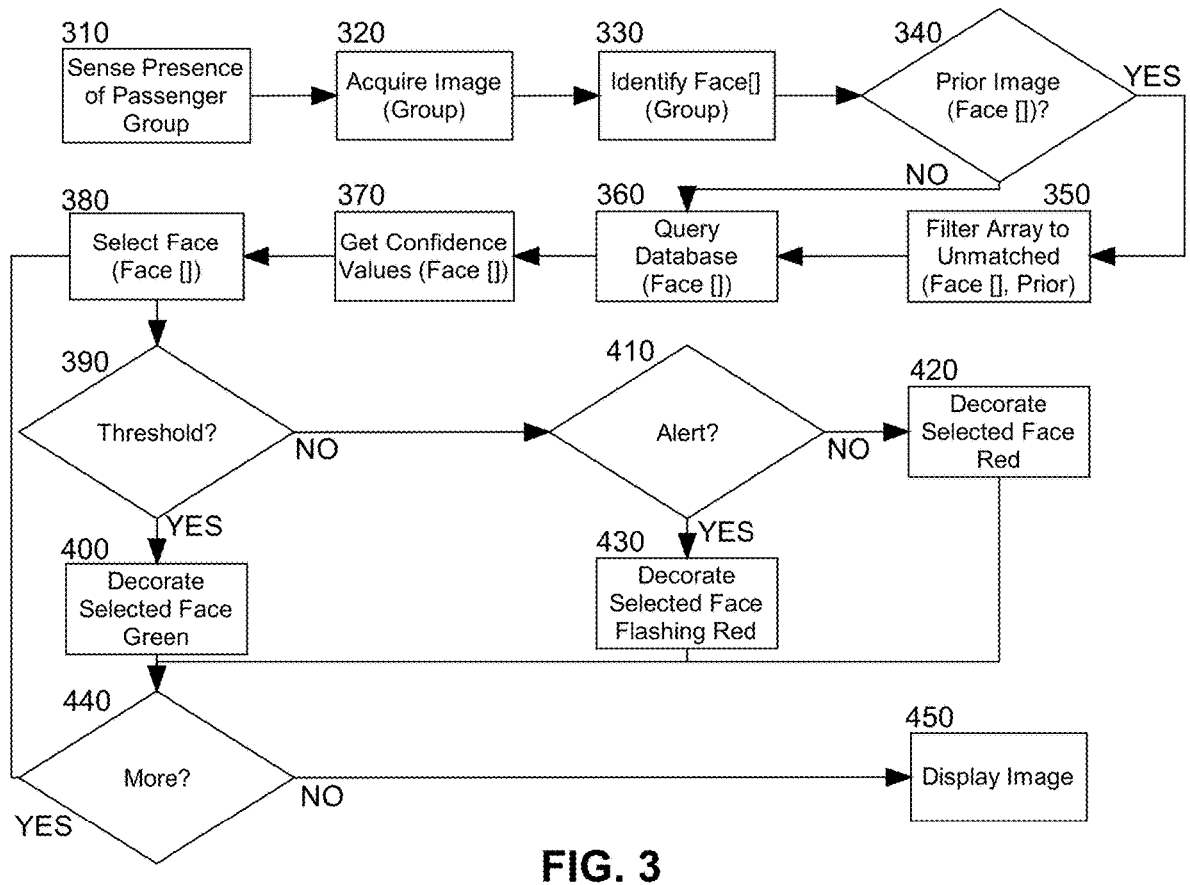

In even yet further illustration of the operation of the passenger identification module 300, FIG. 3 is a flow chart illustrating a process for high throughput passenger identification in portal security. Beginning in block 310, a passenger group of different passengers approaching a portal passageway is detected and an image is acquired of the group, for instance by an image sensor amongst multiple image sensors. In block 330, each face in the image is identified and stored in an array of faces for the image. Then, in decision block 340, it is determined whether a previously acquired image by another or the same one of the image sensors has already been processed to produce the array of faces. If so, in block 350 the array of faces is filtered to exclude any face already processed to have a corresponding confidence value of matching that does not fall short of a pre-determined threshold.

In block 360, a database of faces is then queried with the remaining faces of the array of faces to retrieve in block 370, a corresponding confidence value of matching for each face in the array. In block 380, a first face in the array is selected and in decision block 390, it is determined whether or not a corresponding confidence value of matching falls short of the pre-determined threshold. If not, a decorator is drawn in the image by way of a green colored outline around the face. Otherwise, in decision block 410, it is determined whether or not an alert condition is set—namely whether or not the image reflects a proximity to the portal passageway leaving little time before the group of passengers will cross through the portal passageway. In that instance, a decorator is drawn in the image by way of a flashing red colored outline around the face in block 430.

Optionally, to the extent that the image reflects a proximity to the portal passageway leaving little time before the group of passengers will cross through the portal passageway, an alert message can be transmitted to a mobile device of a gate agent positioned proximate to the portal passageway, for instance a tablet computer. To the extent that the tablet computer enjoys a wireless network connection common to the host computing system hosting the passenger identification module so as to form an Intranet, the alert can be transmitted as a message on the Intranet at a much greater speed than a message transmitted across multiple different networks through different gateways. In any event, to the extent that the alert condition is not set, in block 420 only a solid red colored outline is drawn around the face in the image. In either circumstance, in decision block 440, it is determined whether or not additional faces in the array remain to be processed. If so, the process repeats through block 380. Otherwise, in block 450 the image is then displayed in a display proximate to the portal passageway.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A data processing system adapted for high throughput passenger identification in portal security, the system comprising:
   a host computing system comprising at least one processor and memory;
   a display coupled to the host computing system and positioned at a portal passageway leading into a secure area;
   an image acquisition device communicatively linked to the host computing system and disposed at the portal passageway, the image acquisition device continuously acquiring imagery at the portal passageway and transmitting the acquired imagery to the display;
   a database of faces coupled to the host computing system; and,
   a high throughput passenger identification module comprising computer program instructions executing in the host computing system and enabled to perform:
      receiving from the image acquisition device as part of the continuously acquired imagery, a contemporaneously acquired image of a group of individuals approaching the portal passageway;
      identifying a set of faces of the group of individuals in the contemporaneously acquired image;
      querying the database with each identified face in the set and for each face assigning a confidence value of having matched the face to a record of a known person in the database;
      visually decorating each face in the contemporaneously acquired image with an initial visual characteristic on condition that a correspondingly assigned confidence value falls short of a threshold, but with a different visual characteristic on condition that the correspondingly assigned confidence value does not fall short of the threshold;
      displaying the contemporaneously acquired image as part of the continuously acquired imagery in the display;
      receiving from the image acquisition device a subsequently acquired image of the group of individuals approaching the portal passageway;
      identifying the set of faces of the group of individuals in the subsequently acquired image;
      re-querying the database with each identified face in the set and for each face assigning a new confidence value of having matched the face to a record of a known person in the database;
      visually re-decorating each face of the subsequently acquired image with the initial visual characteristic on condition that the correspondingly assigned new confidence value falls short of the threshold, but with the different visual characteristic on condition that the correspondingly assigned new confidence value does not fall sort of the threshold; and, displaying the subsequently acquired image in the display in place of the contemporaneously acquired image.

2. The system of claim 1, wherein the computer program instructions executing in the host computing system are further enabled to perform:
filtering the set to include only those of the faces in the set having a correspondingly but previously assigned confidence value from the contemporaneously acquired image that falls short of the threshold;
visually decorating each face filtered from the set in the subsequently acquired image with the different visual characteristic;
querying the database with each face remaining in the filtered set and for each face remaining in the filtered set, assigning a new confidence value of having matched the face to a record of a known person in the database;
visually decorating each face of the subsequently acquired image in the filtered set with the initial visual characteristic on condition that the correspondingly assigned new confidence value falls short of the threshold, but with the different visual characteristic on condition that the correspondingly assigned new confidence value does not fall sort of the threshold; and,
displaying the subsequently acquired image in the display in place of the contemporaneously acquired image.

3. The system of claim 2, wherein the computer program instructions executing in the host computing system are further enabled to perform:
receiving from the image acquisition device a further subsequently acquired image of the group of individuals approaching the portal passageway;
identifying a new set of faces of the group of individuals from a most recently, previously acquired image within the further subsequently acquired image;
filtering the new set to include only those of the faces in the new set that have a correspondingly but previously assigned confidence value from the a previously acquired image that falls short of the threshold;
visually decorating each face filtered from the new set with the different visual characteristic;
querying the database with each face in the filtered new set and for each face in the filtered new set, assigning a further confidence value of having matched the face to a record of a known person in the database;
visually decorating each face of the further subsequently acquired image in the filtered new set with a new visual characteristic on condition that the correspondingly assigned further confidence value falls short of the threshold, but with the different visual characteristic on condition that the correspondingly further assigned confidence value does not fall short of the threshold; and,
displaying the further subsequently acquired image in the display in place of the contemporaneously acquired image.

4. The system of claim 1, wherein the initial visual characteristic is a red outline drawn about a corresponding face, and the different visual characteristic is a green outline drawn about a corresponding face.

5. The system of claim 3, wherein the new visual characteristic is a flashing red outline drawn about a corresponding face.

6. The system of claim 1, wherein the initial visual characteristic is a red outline drawn about a corresponding face, and the different visual characteristic is a green outline drawn about a corresponding face and a name of an individual associated with the corresponding face.

7. The system of claim 3, wherein the image acquisition device comprises at least two different image acquisition sensors communicatively linked to the host computing system with a first of the image acquisition sensors being disposed between a second of the image acquisition sensors and the portal passageway leading into a secure area, wherein the contemporaneously acquired image is acquired by the first of the image acquisition sensors and the further subsequently acquired image is acquired by the second of the image acquisition sensors.

8. A method for high throughput passenger identification in portal security, the method comprising:
activating an image acquisition device disposed at a portal passageway leading into a secured area, the image acquisition device continuously acquiring imagery at the portal passageway and transmitting the acquired imagery to a display also disposed at the portal passageway;
receiving in memory of a host computing system from the image acquisition device as part of the continuously acquired imagery a contemporaneously acquired image of a group of individuals approaching the portal passageway;
identifying a set of faces of the group of individuals in the contemporaneously acquired image;
querying a database of faces with each identified face in the set and for each face assigning a confidence value of having matched the face to a record of a known person in the database;
visually decorating each face in the contemporaneously acquired image with an initial visual characteristic on condition that a correspondingly assigned confidence value falls short of a threshold, but with a different visual characteristic on condition that the correspondingly assigned confidence value does not fall short of the threshold;
displaying the contemporaneously acquired image as part of the continuously acquired imagery in the display;
receiving from the image acquisition device a subsequently acquired image of the group of individuals approaching the portal passageway;
identifying the set of faces of the group of individuals in the subsequently acquired image;
re-querying the database with each identified face in the set and for each face assigning a new confidence value of having matched the face to a record of a known person in the database;
visually re-decorating each face of the subsequently acquired image with the initial visual characteristic on condition that the correspondingly assigned new confidence value falls short of the threshold, but with the different visual characteristic on condition that the correspondingly assigned new confidence value does not fall sort of the threshold; and,
displaying the subsequently acquired image in the display in place of the contemporaneously acquired image.

9. The method of claim 8, further comprising:
filtering the set to include only those of the faces in the set having a correspondingly but previously assigned confidence value from the contemporaneously acquired image that falls short of the threshold;
visually decorating each face filtered from the set in the subsequently acquired image with the different visual characteristic;

querying the database with each face remaining in the filtered set and for each face remaining in the filtered set, assigning a new confidence value of having matched the face to a record of a known person in the database;

visually decorating each face of the subsequently acquired image in the filtered set with the initial visual characteristic on condition that the correspondingly assigned new confidence value falls short of the threshold, but with the different visual characteristic on condition that the correspondingly assigned new confidence value does not fall sort of the threshold; and, displaying the subsequently acquired image in the display in place of the contemporaneously acquired image.

10. The method of claim 9, further comprising:

receiving from the image acquisition device a further subsequently acquired image of the group of individuals approaching the portal passageway;

identifying a new set of faces of the group of individuals from a most recently, previously acquired image within the further subsequently acquired image;

filtering the new set to include only those of the faces in the new set that have a correspondingly but previously assigned confidence value from the a previously acquired image that falls short of the threshold;

visually decorating each face filtered from the new set with the different visual characteristic;

querying the database with each face in the filtered new set and for each face in the filtered new set, assigning a further confidence value of having matched the face to a record of a known person in the database;

visually decorating each face of the further subsequently acquired image in the filtered new set with a new visual characteristic on condition that the correspondingly assigned further confidence value falls short of the threshold, but with the different visual characteristic on condition that the correspondingly further assigned confidence value does not fall short of the threshold; and, displaying the further subsequently acquired image in the display in place of the contemporaneously acquired image.

11. The method of claim 8, wherein the initial visual characteristic is a red outline drawn about a corresponding face, and the different visual characteristic is a green outline drawn about a corresponding face.

12. The method of claim 10, wherein the new visual characteristic is a flashing red outline drawn about a corresponding face.

13. The method of claim 10, wherein the image acquisition device comprises at least two different image acquisition sensors communicatively linked to the host computing system with a first of the image acquisition sensors being disposed between a second of the image acquisition sensors and the portal passageway leading into a secure area, wherein the contemporaneously acquired image is acquired by the first of the image acquisition sensors and the further subsequently acquired image is acquired by the second of the image acquisition sensors.

14. A computer program product for high throughput passenger identification in portal security, the computer program product including a non-transitory computer readable storage medium having program instructions embodied therewith, the program instructions executable by a device to cause the device to perform a method including:

activating an image acquisition device disposed at a portal passageway leading into a secured area, the image acquisition device continuously acquiring imagery at the portal passageway and transmitting the acquired imagery to a display also disposed at the portal passageway;

receiving in memory of a host computing system from the image acquisition device as part of the continuously acquired imagery a contemporaneously acquired image of a group of individuals approaching the portal passageway;

identifying a set of faces of the group of individuals in the contemporaneously acquired image;

querying a database of faces with each identified face in the set and for each face assigning a confidence value of having matched the face to a record of a known person in the database;

visually decorating each face in the contemporaneously acquired image with an initial visual characteristic on condition that a correspondingly assigned confidence value falls short of a threshold, but with a different visual characteristic on condition that the correspondingly assigned confidence value does not fall short of the threshold;

displaying the contemporaneously acquired image as part of the continuously acquired imagery in the display;

receiving from the image acquisition device a subsequently acquired image of the group of individuals approaching the portal passageway;

identifying the set of faces of the group of individuals in the subsequently acquired image;

re-querying the database with each identified face in the set and for each face assigning a new confidence value of having matched the face to a record of a known person in the database;

visually re-decorating each face of the subsequently acquired image with the initial visual characteristic on condition that the correspondingly assigned new confidence value falls short of the threshold, but with the different visual characteristic on condition that the correspondingly assigned new confidence value does not fall sort of the threshold; and, displaying the subsequently acquired image in the display in place of the contemporaneously acquired image.

15. The computer program product of claim 14, wherein the method further comprises:

filtering the set to include only those of the faces in the set having a correspondingly but previously assigned confidence value from the contemporaneously acquired image that falls short of the threshold;

visually decorating each face filtered from the set in the subsequently acquired image with the different visual characteristic;

querying the database with each face remaining in the filtered set and for each face remaining in the filtered set, assigning a new confidence value of having matched the face to a record of a known person in the database;

visually decorating each face of the subsequently acquired image in the filtered set with the initial visual characteristic on condition that the correspondingly assigned new confidence value falls short of the threshold, but with the different visual characteristic on condition that the correspondingly assigned new confidence value does not fall sort of the threshold; and, displaying the subsequently acquired image in the display in place of the contemporaneously acquired image.

16. The computer program product of claim 15, wherein the method further comprises:

receiving from the image acquisition device a further subsequently acquired image of the group of individuals approaching the portal passageway;

identifying a new set of faces of the group of individuals from a most recently, previously acquired image within the further subsequently acquired image;

filtering the new set to include only those of the faces in the new set that have a correspondingly but previously assigned confidence value from the a previously acquired image that falls short of the threshold;

visually decorating each face filtered from the new set with the different visual characteristic;

querying the database with each face in the filtered new set and for each face in the filtered new set, assigning a further confidence value of having matched the face to a record of a known person in the database;

visually decorating each face of the further subsequently acquired image in the filtered new set with a new visual characteristic on condition that the correspondingly assigned further confidence value falls short of the threshold, but with the different visual characteristic on condition that the correspondingly further assigned confidence value does not fall short of the threshold; and, displaying the further subsequently acquired image in the display in place of the contemporaneously acquired image.

17. The computer program product of claim 14, wherein the initial visual characteristic is a red outline drawn about a corresponding face, and the different visual characteristic is a green outline drawn about a corresponding face.

18. The computer program product of claim 16, wherein the new visual characteristic is a flashing red outline drawn about a corresponding face.

19. The computer program product of claim 16, wherein the image acquisition device comprises at least two different image acquisition sensors communicatively linked to the host computing system with a first of the image acquisition sensors being disposed between a second of the image acquisition sensors and the portal passageway leading into a secure area, wherein the contemporaneously acquired image is acquired by the first of the image acquisition sensors and the further subsequently acquired image is acquired by the second of the image acquisition sensors.

* * * * *